(12) United States Patent
Fletcher et al.

(10) Patent No.: US 7,954,049 B2
(45) Date of Patent: May 31, 2011

(54) ANNOTATING MULTIMEDIA FILES ALONG A TIMELINE

(75) Inventors: Joseph T. Fletcher, Seattle, WA (US); Michael H. Miller, Bellevue, WA (US); Justin M. Maguire, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 11/383,346

(22) Filed: May 15, 2006

(65) Prior Publication Data

US 2007/0266304 A1    Nov. 15, 2007

(51) Int. Cl.
   *G06F 17/24* (2006.01)
(52) U.S. Cl. ........ 715/231; 715/212; 715/230; 715/232; 707/608
(58) Field of Classification Search .................. 715/230, 715/212, 231, 232; 707/608
   See application file for complete search history.

(56) References Cited

U.S. PATENT DOCUMENTS

| | | | |
|---|---|---|---|
| 4,649,499 A | 3/1987 | Sutton et al. | |
| 5,333,266 A | 7/1994 | Boaz et al. | |
| 5,524,193 A | 6/1996 | Covington et al. | |
| 5,526,407 A | 6/1996 | Russell et al. | |
| 5,572,643 A | 11/1996 | Judson | |
| 5,583,980 A | 12/1996 | Anderson | |
| 5,600,775 A | 2/1997 | King et al. | |
| 5,633,916 A | 5/1997 | Goldhagen et al. | |
| 5,699,089 A | 12/1997 | Murray | |
| 5,732,216 A | 3/1998 | Logan et al. | |
| 5,809,250 A | 9/1998 | Kisor | |
| 5,838,313 A | * 11/1998 | Hou et al. | 715/201 |
| 5,893,087 A | 4/1999 | Wlaschin et al. | |
| 5,893,110 A | 4/1999 | Weber et al. | |
| 5,903,892 A | 5/1999 | Hoffert et al. | |
| 5,923,848 A | 7/1999 | Goodhand et al. | |
| 5,969,716 A | 10/1999 | Davis et al. | |
| 5,991,365 A | 11/1999 | Pizano et al. | |
| 6,006,241 A | 12/1999 | Purnaveia et al. | |
| 6,009,462 A | 12/1999 | Birrell et al. | |
| 6,081,829 A | 6/2000 | Sidana | |
| 6,085,185 A | 7/2000 | Matsuzawa et al. | |
| 6,105,055 A | * 8/2000 | Pizano et al. | 709/204 |

(Continued)

FOREIGN PATENT DOCUMENTS

EP    0650126    4/1995

(Continued)

OTHER PUBLICATIONS

"In re Lowry," 32 USPQ2d, U.S. Court of Appeals Federal Circuit, No. 93-1558, Decided Aug. 26, 1994, p. 1031-1035.

(Continued)

*Primary Examiner* — Stephen S Hong
*Assistant Examiner* — I-Chan Yang
(74) *Attorney, Agent, or Firm* — Perkins Coie LLP (57) ABSTRACT

A facility for annotating media files is described. In various embodiments, the facility displays a timeline indicating a duration of the media file, determines that an annotation is associated with the media file, and displays in an area near the timeline an indication of the associated annotation. In various embodiments, the facility displays a timeline indicative of a duration of the media file, receives an indication to add an annotation at an annotation time relative to the duration of the timeline, receives and stores an annotation, associates the annotation with the annotation time, and displays an indication of the stored annotation at an area near the timeline.

21 Claims, 11 Drawing Sheets

U.S. PATENT DOCUMENTS

| | | | |
|---|---|---|---|
| 6,144,375 A | 11/2000 | Jain et al. | |
| 6,173,287 B1 | 1/2001 | Eberman et al. | |
| 6,173,317 B1 | 1/2001 | Chaddha et al. | |
| 6,230,172 B1 | 5/2001 | Purnaveja et al. | |
| 6,311,189 B1 | 10/2001 | deVries et al. | |
| 6,317,141 B1 | 11/2001 | Pavely et al. | |
| 6,332,144 B1 | 12/2001 | deVries et al. | |
| 6,332,147 B1 * | 12/2001 | Moran et al. | 715/203 |
| 6,360,234 B2 | 3/2002 | Jain et al. | |
| 6,366,296 B1 | 4/2002 | Boreczky et al. | |
| 6,404,978 B1 | 6/2002 | Abe et al. | |
| 6,424,370 B1 | 7/2002 | Courtney | |
| 6,438,566 B1 | 8/2002 | Okuno et al. | |
| 6,449,653 B2 | 9/2002 | Klemets et al. | |
| 6,452,615 B1 | 9/2002 | Chiu et al. | |
| 6,452,875 B1 | 9/2002 | Lee et al. | |
| 6,484,156 B1 * | 11/2002 | Gupta et al. | 707/1 |
| 6,571,295 B1 | 5/2003 | Sidana | |
| 6,584,479 B2 | 6/2003 | Chang et al. | |
| 6,701,311 B2 | 3/2004 | Biebesheimer et al. | |
| 6,718,308 B1 | 4/2004 | Nolting | |
| 6,724,401 B1 | 4/2004 | Hennum et al. | |
| 6,833,865 B1 | 12/2004 | Fuller et al. | |
| 6,871,318 B1 * | 3/2005 | Wynblatt et al. | 715/201 |
| 6,901,207 B1 | 5/2005 | Watkins | |
| 6,922,702 B1 | 7/2005 | Jensen et al. | |
| 6,956,593 B1 | 10/2005 | Gupta et al. | |
| 7,051,275 B2 | 5/2006 | Gupta et al. | |
| 7,111,009 B1 | 9/2006 | Gupta et al. | |
| 7,162,690 B2 | 1/2007 | Gupta et al. | |
| 7,233,951 B1 * | 6/2007 | Gainer et al. | 1/1 |
| 7,631,015 B2 | 12/2009 | Gupta et al. | |
| 7,702,730 B2 * | 4/2010 | Spataro et al. | 709/205 |
| 7,823,058 B2 * | 10/2010 | Pea et al. | 715/230 |
| 2002/0026478 A1 * | 2/2002 | Rodgers et al. | 709/205 |
| 2002/0069190 A1 | 6/2002 | Geiselhart | |
| 2002/0112004 A1 | 8/2002 | Reid et al. | |
| 2002/0118300 A1 | 8/2002 | Middleton et al. | |
| 2003/0078973 A1 | 4/2003 | Przekop et al. | |
| 2004/0267871 A1 * | 12/2004 | Pratley et al. | 709/200 |
| 2005/0050021 A1 * | 3/2005 | Timmons | 707/3 |
| 2005/0068905 A1 | 3/2005 | Dorner et al. | |
| 2005/0081159 A1 | 4/2005 | Gupta et al. | |
| 2005/0160080 A1 | 7/2005 | Dawson | |
| 2005/0198006 A1 | 9/2005 | Boicey et al. | |
| 2005/0198193 A1 | 9/2005 | Halme | |
| 2005/0234885 A1 | 10/2005 | Szeto et al. | |
| 2006/0015904 A1 | 1/2006 | Marcus | |
| 2006/0026013 A1 | 2/2006 | Kraft | |
| 2007/0011206 A1 | 1/2007 | Gupta et al. | |
| 2007/0276852 A1 | 11/2007 | Fletcher | |

FOREIGN PATENT DOCUMENTS

| | | |
|---|---|---|
| EP | 0899737 | 3/1999 |
| GB | 2254725 A | 10/1992 |
| GB | 2301260 A | 11/1996 |
| WO | WO-97/49251 | 12/1997 |
| WO | WO-02/42864 | 5/2002 |

OTHER PUBLICATIONS

"Mastering Microsoft Office 97," Mosely and Boodey, SYBEX, Inc., 1996, pp. 755-763 and pp. 811-816.

"Merriam Webster's Collegiate Dictionary," Tenth Edition, 1996, pp. 47, 55 and 56, 5 pages total.

"Some Frequently Asked Questions about RTP," archived Jun. 6, 1997, web.archive.org/web/19970607053036/http://www.cs.columbia.edu/~hgs/rtp/faq.html.

"Synchronized Multimedia Integration Language (SMIL) 1.0 Specification," W3C Recommendation, Jun. 15, 1998, .w3.org/TR/REC-smil/.

"Webster's Encyclopedic Unabridged Dictionary of the English Language," 1989, Portland House, 3 pages.

"Webster's Seventh New Collegiate Dictionary", Reg. U.S. Pat. Off., 3 pages.

Abowd, Gregory D. et al., "Teaching and Learning as Multimedia Authoring: The Classroom 2000 Project," Proceedings of the Multimedia '96, Boston, MA, Nov. 1996, ACM Press, pp. 187-198.

Bessler et al., DIANE: A Multimedia Annotation System, Proceedings of the ECMAST '97, Milan, Italy, May 1997.

Booker, Ellis, "Microsoft and RealNetworks Wage Media War," techweb network, Jul. 10, 1998, .techweb.com/wire/46802389.

Carrer, M. et al., "An Annotation Engine for Supporting Video Database Population," MCL Technical Report No. Aug. 15, 1996.

Chalfonte, Barbara L. et al., "Expressive Richness: A Comparison of Speech and Text as Media for Revision," Proceedings of the CHI' 91, © 1991 ACM Press, pp. 21-26.

Chen, Zhigang et al., "Video and Audio: Organization and Retrieval in the WWW," Jan. 28, 1998, White Paper.

Davis et al., "CoNote System Overview," 1995, Available at .cs.cornell.edu/home/dph/annotation/annotations.html.

Dumais, Susan et al., "Optimizing Search by Showing Results in Context," SIGCHI'01, Mar. 31-Apr. 4, 2001, Seattle, WA, pp. 277-284, © 2001 ACM, vol. No. 3, Issue No. 1.

Gabbe, John D. et al., "Towards Intelligent Recognition of Multimedia Episodes in Real-Time Applications," Multimedia 94, Oct. 1994, San Francisco, CA, © ACM 1994, pp. 227-236.

Gaines, Brian R et al., "Open Architecture Multimedia Documents," Proceedings of the Multimedia '93, Anaheim, CA, Aug. 1993, ACM Press, pp. 137-146.

Gould, Eric Justin, "Relativity Controller: Reflecting User Perspective in Document Spaces," Adjunct Proceedings of INTERCHI '93, 1993, ACM Press, pp. 125-126.

Kim, Ki-Wook et al., "VIRON: An Annotation-Based Video Information Retrieval System," Proceedings of COMPSAC '96, Seoul, South Korea, Aug. 1996, © 1996 IEEE Press, pp. 298-303.

Laliberte, Daniel and Alan Braverman, "A Protocol for Scalable Group and Public Annotations," WWW 1995.

Lawton, Daryl T. et al., "The Knowledge Weasel Hypermedia Annotation System," Proceedings of the HyperText '93, Nov. 1993, © 1993 ACM Press, pp. 106-117.

Leake, David B. and Ryan Scherle, "Towards Context-Based Search Engine Selection," IUI'01, Jan. 14-17, 2001, Santa Fe, New Mexico, pp. 109-112, © 2001 ACM.

Lee, Suh-Yin et al., "Video Indexing—An Approach Based on Moving Object and Track," Proceedings of the SPIE, vol. 1908, Feb. 2-3, 1993, pp. 25-36.

Marshall, Catherine C., "Toward an ecology of hypertext annotation," Proceedings of the HyperText, Pittsburgh, PA, Jun. 1998, ACM Press, pp. 40-48.

Nerney, Chris, "RealNetworks unveils software line for multimedia displays," NetworkWorld, May 4, 1998, .nwfusion.com/news/0504real.html.

Neuwirth, Christine M. et al., "Distributed Collaborative Writing: A Comparison of Spoken and Written Modalities for Reviewing and Revising Documents," Proceedings of the CHI '94, Boston, MA, Apr. 1994, © 1994 ACM Press, pp. 51-57.

Phelps, Thomas et al., "Multivalent Annotations," Proceedings of the First European Conference on Research and Advanced Technology for Digital Libraries, Pisa, Italy, Sep. 1-3, 1997.

Pizano, Arturo et al., "Integrated Multimedia Messaging Concepts and Applications," Proceedings of the 1996 ACM Symposium on Applied Computing, Philadelphia, Pennsylvania, © 1996 ACM Press, pp. 12-16.

Pope, Arthur et al., "Video Abstraction: Summarizing Video Content for Retrieval and Visualization," In Proc. Thirty-Second Asilomar Conference on Signals, Systems & Computers, 1998, pp. 915-919.

Roscheisen, Martin et al., "Beyond Browsing: Shared Comments, SOAPs, Trails, and On-Line Communities," WWW'95, 1995.

Roscheisen, Martin et al., "Shared Web Annotations as a Platform for Third-Party Value-Added, Information Providers: Architecture, Protocols, and Usage Examples," Technical Report CSDTR/DLTR 1997, Stanford University.

Schickler, Matthew A. et al., "Pan-Browser Support for Annotations and Other Meta-Information on the World Wide Web," Proceedings of the Fifth International World Wide Web Conference, Paris, France, May 1996.

Smith, Brian K. et al. "What Should a Wildebeest Say? Interactive Nature Films for High School Classrooms," Proceedings of the ACM Multimedia '97, ACM Press, pp. 193-201.

Smith, MacKenzie, "DynaText: An Electronic Publishing System," Computers and the Humanities, vol. 27, 1993-1994, Technical Review, pp. 415-420.

Stanford Online: Online MSEE Degree with an emphasis on Telecommunications, scpd.stanford.edu/ce/telecom/onlinedegree.html, [last accessed Nov. 3, 2000].

Weber, Karon et al., "Marquee: A Tool for Real-Time Video Logging," Proceedings of CHI '94, Boston, MA, Apr. 1994, ©1994 ACM Press, pp. 58-64.

Wei, Bin et al., "MediaAlert—A Broadcast Video Monitoring and Alerting System for Mobile Users," 3rd International Conference on Mobile Systems, Applications and Services, Seattle, WA, 2005, pp. 25-38, ACM.

Wei, Sha Xin, "MediaWeaver—A Distributed Media Authoring System for Networked Scholarly Workspaces," Jun. 2, 1997, Stanford University.

Hjelsvold, Rune et al., "Integrated Video Archive Tools," ACM Multimedia 95—Electronic Proceedings, Nov. 5-9, 1995, San Francisco, California.

* cited by examiner

Annotations Table 800 — 802, 804, 806, 808, 810

| ID | Time | Type | Author | Content |
|---|---|---|---|---|
| 1 | 10:24 | text | Adam | We should show ... |
| 2 | 12:18 | text | Ellen | We should mention ... |

Annotations Table 816

| ID | Time | Type | Author | Content |
|---|---|---|---|---|
| 1 | 10:24 | text | Adam | We should show ... |
| 2 | 12:18 | audio | Ellen | http://x.y.z/audio.wmp |

ANNOTATING MULTIMEDIA FILES ALONG A TIMELINE

BACKGROUND

Users of computer systems employ various applications to render media files, including multimedia files. A media file is a digital file that contains digitized information, such as text, audio, video, images, and so forth. A multimedia file is a digital file that contains multiple types of media. A common example of a multimedia file is a video file that contains a correlated sequence of images and audio, such as a movie. Rendering is the process of converting information from digital to analog form so that a person can perceive the information, such as by displaying text, playing back audio or video, drawing an image, and so forth.

Another example of a multimedia file is a collaboration file that is created, manipulated, or stored by collaboration software. Collaboration software enables multiple users to share an application, view an online presentation, or collaborate in other ways using computing devices that are engaged in a collaboration session. A collaboration session enables participants to share information or applications via their computing devices. The collaboration software can record the collaboration session in a multimedia file, which can contain audio, video, images, presentation graphics, mouse cursor movements, keyboard input, text, documents, and other facets of the collaboration.

Media files can become very large. As an example, users may collaborate in a collaboration session that lasts for several hours. The collaboration session may also span multiple sessions so that, for example, a collaboration file has information from all collaboration sessions that, together, last for hours. As another example, a movie can span two hours or longer.

It is difficult for users to locate relevant or desirable content in large media files. As an example, a user may desire to locate a particular scene in a movie, a particular training segment in a training-related collaboration file, and so forth. The user can find it difficult to locate the relevant or desirable portions because the user may not know the position in the media files at which the desirable portions are located. Conventionally, the user may start rendering a media file from the beginning until the relevant or desirable content is rendered. Alternatively, the user may estimate a position and employ a user interface element (e.g., a slider bar or timeline) to begin rendering the media file at various points until the relevant or desirable content is located.

SUMMARY

A facility is provided for adding, identifying, and rendering annotation information that is associated with a media file. Examples of media files include collaboration files that store a collaboration session, audio files, video files, and other multimedia files. A user can add an annotation that is associated with a specified point or region associated with the media file, such as a time or time span relative to the beginning of the media file. Alternatively, the facility can identify annotations based on user actions during a collaboration session. The facility then stores the annotations in association with the media file. When the media file is later rendered, or upon user input, the facility can display the stored annotations. Indications of annotations can be identified on a timeline representing the media file, such as by using markers near the timeline.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A-7B are display diagrams illustrating aspects of user interfaces associated with the facility in various embodiments.

DETAILED DESCRIPTION

A facility is provided for managing annotation information that is associated with a media file. Managing annotation information includes adding, identifying, and rendering the annotation information. Annotation information is information that is added to a media file, such as without affecting the multimedia content contained by the media file. In various embodiments, the facility receives annotation information from a user or actively collects the annotation information based on the user's actions. The facility receives annotation information when the user directs the facility to add annotation information and provides the annotation information directly. The facility collects the annotation information based on the user's actions by collecting keyboard or mouse events, receiving events from an application, and so forth. The received or collected annotation information is associated with a particular point or region in a media file, and the facility stores the annotation information accordingly. This point or region can be referred to as an annotation time. When a user causes the media file to be rendered, the facility informs the user that an annotation is available and can render the stored annotation. The facility can inform the user that an annotation is available by providing an indication, such as a marker, near a timeline that is associated with the media file. Annotation information can be provided in various formats and can have various content. As an example, the annotation information can include an identification of the user that provided the annotation and the point or region with which the annotation is to be associated, such as a time span in relation to the beginning of the media file. As another example, the annotation information can include annotation text or an identifier of a file containing an annotation (e.g., a video or audio file). As another example, the annotation can be text, audio, images, video, or any other multimedia content.

In various embodiments, a user can provide annotation information by selecting a point or region of a timeline associated with the media file and adding an annotation at an indicated point or region. This point or region would then be identified as an annotation time. As an example, the user can indicate a point in a timeline that represents the media file or a time span corresponding to a portion of the media file, such as by identifying a point with the mouse pointer and depressing a mouse button. The user can then provide the annotation by typing text or selecting a file that contains annotation information that is to be added. This text would then be associated with the media file at the annotation time. Alternatively, the facility can associate information provided by a user when creating or rendering the media file. As an example, the facility detects mouse move events or keyboard events caused by a user while the media file is created or rendered, and captures these events to create annotations. As another example, a user may make a change to a spreadsheet cell during a collaboration session in which a spreadsheet is shared among multiple participants. The facility can capture the changes to the spreadsheet cell as an annotation. As another example, the facility can capture and include as annotation information an identification of the person who is making a presentation, identification of people who have joined or left the meeting and the time, text or other content of presented slides, and so forth.

The collected annotation information can be stored as metadata that is associated with other data without affecting the other data. The metadata can either be stored in the media file or in another file that is associated with the media file. The metadata can be stored in a form that is modifiable and searchable.

In various embodiments, the facility observes and records user activity to create annotations. As an example, the facility determines changes that multiple users make to a document during a collaboration session and records as annotations the changes made by the users. The annotations can include comments added by users, such as when the collaboration application does not record comments in the collaboration file. The annotations can also include other aspects of the collaboration, such as which users were presenting or attending a presentation, at what times they joined the collaboration session, and so forth. The facility can actively collect this information and store the collected information as annotations relative to an annotation time (e.g., the time at which the user made the change or joined a collaboration session).

In various embodiments, a user can view the annotation information when the media file is rendered. As an example, during playback of a recorded collaboration session, a stored annotation may be rendered when the facility renders a portion of the media file corresponding to a time at which the stored annotation is associated with the collaboration file (e.g., the annotation time). As an example, when playing back a movie, the facility can display at twenty-three minutes from the beginning of the movie, text, images, audio, video, etc., that a user added as an annotation that is associated with the twenty-third minute position in the movie.

In various embodiments, a user can search the annotation information of a media file. As an example, the user can search for annotation information that the user or another user associated with a media file. As a further example, a user can search for text or other input that was provided or changed during a collaboration session and that was recorded in a collaboration file. If this information is found, the facility displays indications, such as markers on a timeline, corresponding to a point in a media file at which the annotation information was associated with the media file. Thus, the facility can search for both collaboration information and annotation information.

When the user causes a portion of the media file near the indications to be rendered, the facility also renders the annotations. Alternatively, when the user positions a mouse pointer momentarily over an indication, the facility can render the stored annotation information associated with that indication. The annotation information may be displayed for a specified duration when the media file is rendered.

Thus, the facility enables users to manage annotation information that is associated with a media file, such as by adding, identifying, or rendering annotation information. Doing so removes the difficulty users have in locating relevant or desirable content in large media files.

Figure 1A:
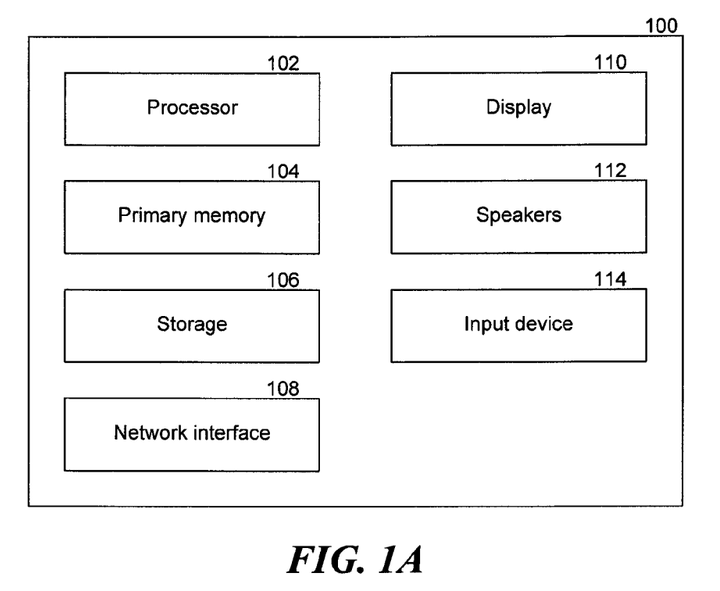
FIG. 1A is a block diagram illustrating an example of a suitable computing environment in which the facility may operate.

Turning now to the figures, FIG. 1A is a block diagram illustrating an example of a suitable computing environment 100 in which the facility may be implemented. A system for implementing the facility includes a general purpose computing device in the form of the computing system 100 ("computer"). Components of the computer may include, but are not limited to, a processing unit 102, a system primary memory 104, a storage device 106, a network adapter or interface 108, a display 110, one or more speakers 112, and an input device 114.

The computer 100 typically includes a variety of computer-readable media that are operable with the storage device 106. Computer-readable media can be any available media that can be accessed by the computer 100 and include both volatile and nonvolatile media and removable and nonremovable media.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also include other networks. Such networking environments are commonplace in homes, offices, enterprisewide computer networks, intranets, and the Internet. The computer 100 can be connected to a network through a network interface or adapter 108, such as to a wired or wireless network.

The computer 100 is only one example of a suitable computing environment and is not intended to suggest any limitation as to the scope of use or functionality of the facility. Neither should the computing system be interpreted as having any dependency or requirement relating to any one or a combination of the illustrated components.

The facility is operational with numerous other general purpose or special purpose computing systems or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
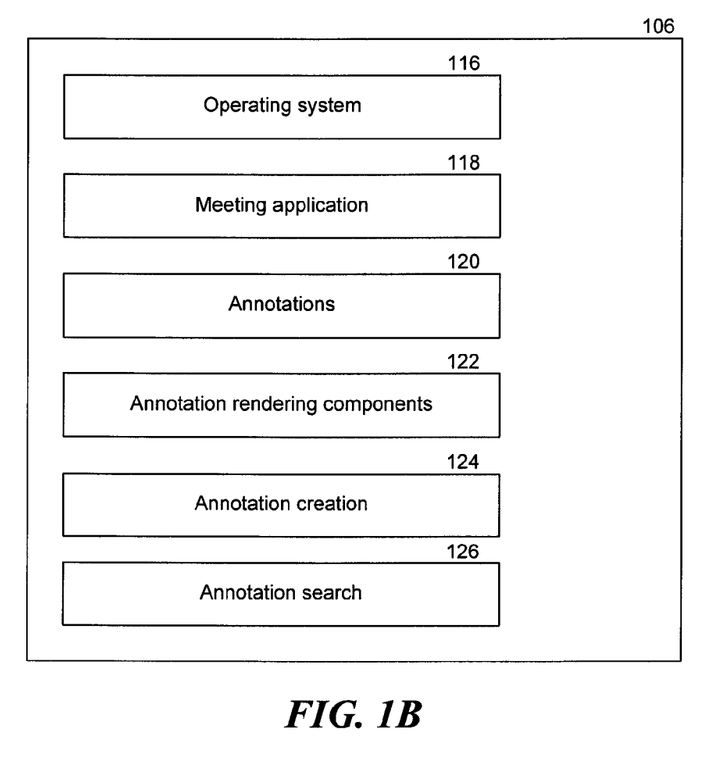
FIG. 1B is a block diagram illustrating a storage device of FIG. 1A in further detail.

FIG. 1B is a block diagram illustrating a storage device of FIG. 1A in further detail. According to the illustrated embodiment, the storage device 106 stores an operating system 116, a meeting application program 118, and one or more annotations 120. The annotations can be stored in files, in a registry, or in any location from which the meeting application program can retrieve data. The storage device may also store other application programs and data (not illustrated). The meeting application program is a type of collaboration software.

The facility may have multiple annotation rendering components 122, such as a text annotation rendering component, an audio annotation rendering component, a video annotation rendering component, and so forth. The facility employs the annotation rendering components to render stored annotations.

The facility may have an annotation creation component 124 that creates annotations, such as based on user actions. As an example, the facility may create annotations when users in a collaboration session modify a document, move a mouse pointer, type information, and so forth.

The facility may have an annotation search component 126 that searches for annotations matching a criterion (or multiple criteria) provided by the user.

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
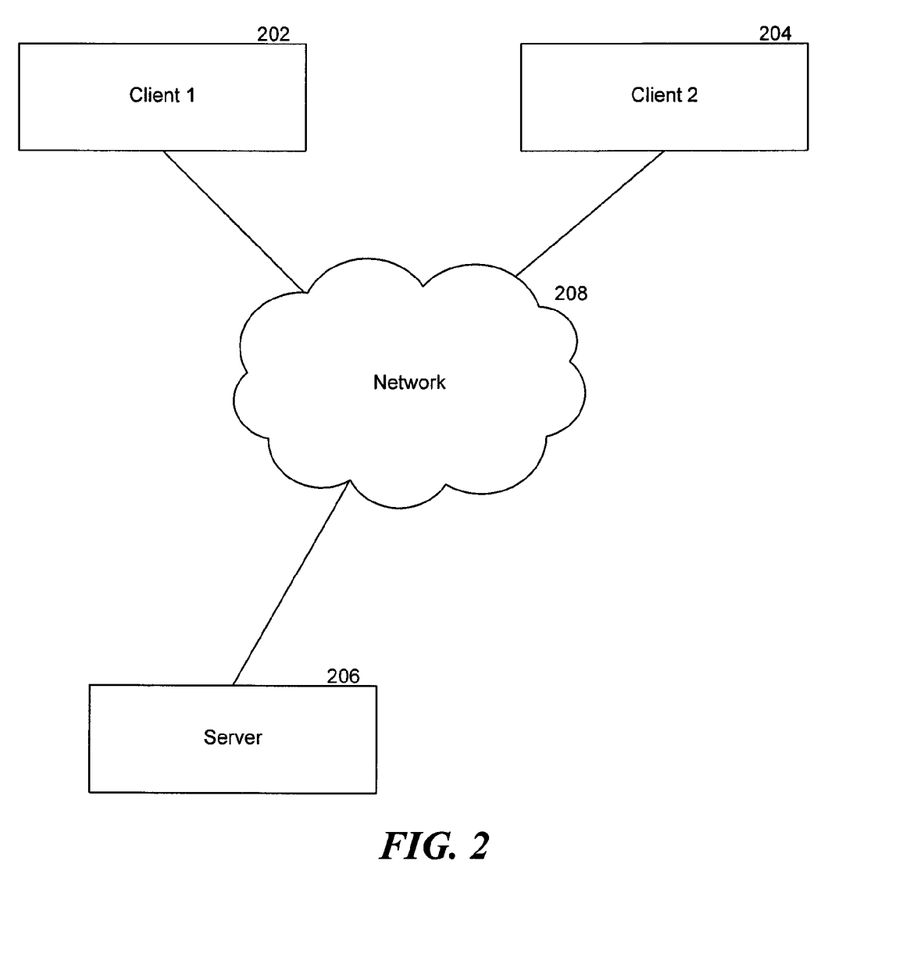
FIG. 2 is a block diagram illustrating an example of a suitable environment in which the facility may operate in some embodiments.

FIG. 2 is a block diagram illustrating an example of a suitable environment in which the facility may operate in some embodiments. The environment has two client computers 202 and 204. The client computers may communicate with each other via a network 208. As an example, client 1 (202) may communicate a message input by a user into a messaging application to a server computer 206 via the network, which then communicates the message to client 2 (204). The server computer may be executing a server portion of the messaging application. The network 208 can be an intranet, the Internet, or a combination of multiple networks. In various embodiments, the environment may have additional client or server computers.

FIGS. 3A-7B are display diagrams illustrating aspects of user interfaces associated with the facility in various embodiments.

Figure 3A:
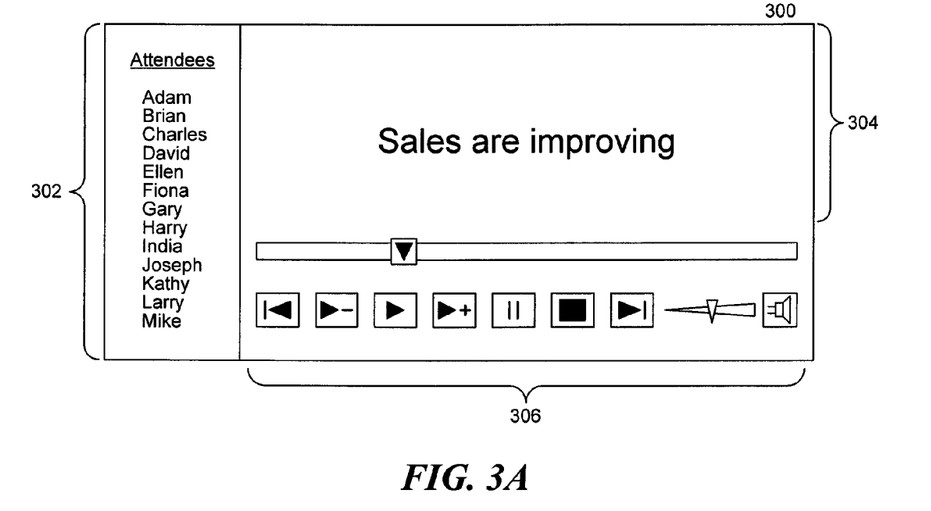

FIG. 3A is a display diagram illustrating a portion of a user interface 300 of a collaboration application. According to the illustrated user interface, several attendees are listed in an attendee region 302. The attendees are either viewing or providing a presentation, the content of which is displayed in a presentation region 304.

The collaboration session can be recorded in a collaboration file and a user can later view a recorded session by rendering the collaboration file, during which a playback controls region 306 may be visible. A user can manipulate the rendering of the recorded collaboration session using the playback controls illustrated in the playback controls region. The playback controls are described in further detail below in relation to FIG. 3B. The playback controls region may be hidden when a user is actively engaged in a collaboration session. As an example, in various embodiments, a user may not see the attendee region and the playback controls region simultaneously.

Figure 3B:
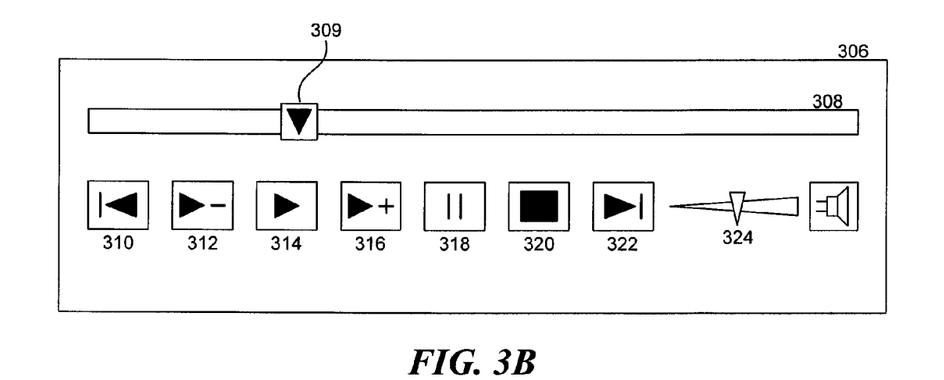

FIG. 3B is a display diagram illustrating the playback controls region 306 in further detail. The playback controls region can have multiple elements (e.g., "controls") that enable a user to control the rendering of a media file, such as a collaboration file.

A timeline 308 indicates a duration of the media file. In some embodiments, the actual duration (e.g., in hours, minutes, and seconds) may additionally be provided (not illustrated). A pointer 309 indicates a position at which the facility is rendering from the media file, in relation to the duration of the media file. When the pointer is at the leftmost position of the timeline, the beginning of the media file is indicated.

When a user selects control 310, the facility moves the pointer to the leftmost position of the timeline. When the user selects control 322, the facility moves the pointer to the rightmost position of the timeline (e.g., the end of the media file).

Controls 312, 314, and 316 enable the user to select a rendering speed. Control 312 enables a user to decrease the rendering speed. Control 314 enables the user to set the rendering speed at a normal speed (e.g., a speed at which the media file was originally recorded or at which rendering time corresponds to "real" time). Control 316 enables the user to increase the rendering speed.

Control 318 enables the user to pause rendering, and control 320 enables the user to stop rendering.

Control 324 enables the user to increase or decrease the volume.

Figure 4:
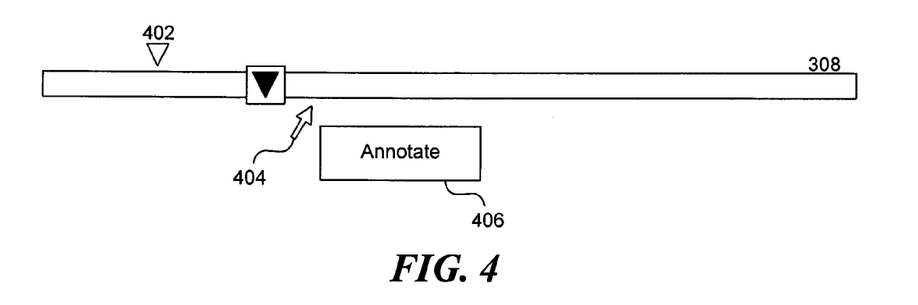

FIG. 4 is a display diagram illustrating the timeline 308 in further detail. An indication 402 of an annotation (e.g., a marker) indicates that an annotation is available. The user can add another annotation by positioning a mouse pointer 404 near the timeline and selecting an Annotate command 406 from a context menu. As an example, the user can depress the right-hand button of a two-button mouse and select an Annotate command on the menu that appears. The user can then provide an annotation. The facility can associate the provided annotation with the time, e.g., relative to an end of the media file, at which the mouse pointer was positioned when the user depressed the mouse button. The facility associates the annotation with the media file at the indicated annotation time. In various embodiments, the user can provide other indications to add annotations, such as by using a keyboard or menu of an application. The user can then type text or indicate a file whose contents are annotations.

As previously discussed, the facility can collect annotation information automatically. As an example, the facility may collect annotations when users make changes to a document during a collaboration session. The annotation indications may then be displayed when the user searches for an annotation or indicates that annotations are to be displayed. As an example, the user can search for all annotations having particular text. As another example, the user can search for all changes made to a particular spreadsheet cell or section of a document. When corresponding annotations are found, the facility provides indications near the timeline, such as markers.

Figure 5A:
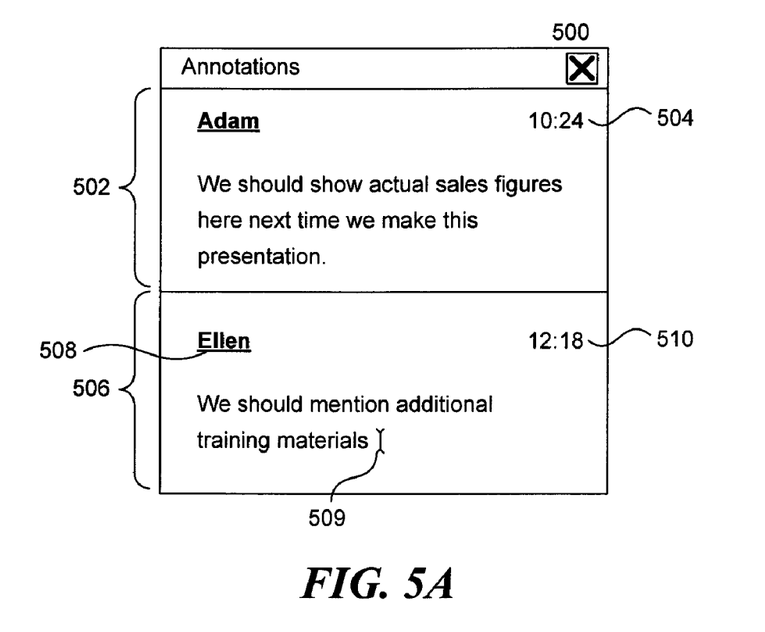

FIG. 5A illustrates a user interface 500 for providing or receiving annotations. The illustrated user interface provides two text annotation regions 502 and 506. Text annotation region 502 indicates that Adam indicated an annotation that is to be displayed when the relevant media file renders at 10 minutes and 24 seconds (504) from the beginning of the media file.

Text region 506 enables a user to enter a text annotation, as is indicated by a text cursor 509. In various embodiments, a text annotation region that receives user input may be indicated using a coloring, border, or other indication that differentiates it from a text annotation region that provides an annotation. These indications can additionally enable users to distinguish among annotations provided by multiple people. In the illustrated embodiment, the facility has automatically provided the name of the user, Ellen (508) and the time in relation to the beginning of the media file, 12 minutes and 18 seconds (510). The facility detected the time based on the position at which the media file was being rendered when the user indicated to add an annotation. In some embodiments, the time is based on the position at which the user positioned a mouse pointer when indicating to add an annotation.

Figure 5B:
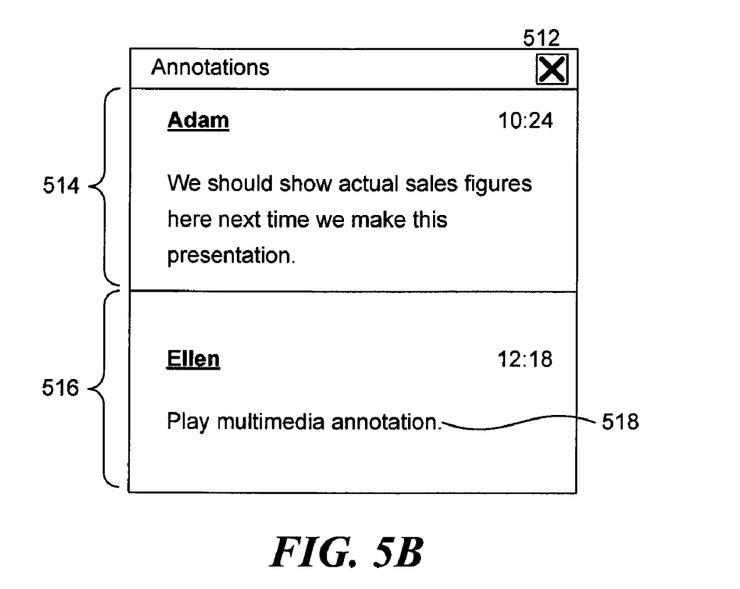

FIG. 5B is similar to FIG. 5A. As an example, text annotation region 514 of user interface 512 is similar to text annotation region 502 of user interface 500. However, the user has provided a multimedia annotation, as is illustrated at annotation region 516. When the facility detects that a multimedia annotation has been stored, it displays an appropriate message 518. The message may contain a hyperlink so that, when selected, the annotation is rendered.

Figure 6A:
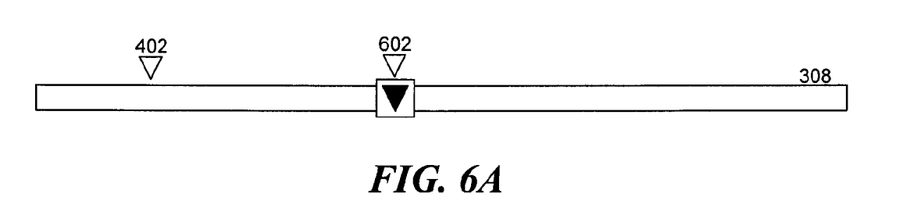

FIG. 6A is a display diagram illustrating the timeline with an additional indication or marker 602 corresponding to the position at which the annotation was added in FIG. 5A or 5B.

Figure 6B:
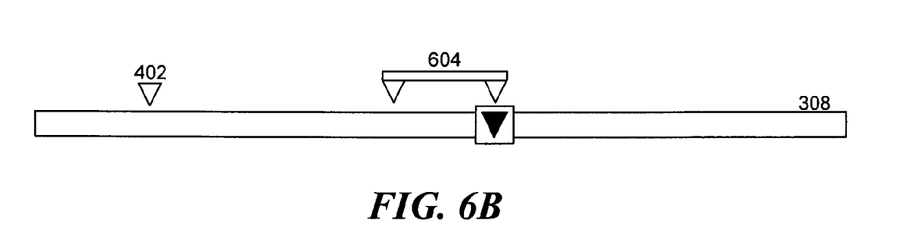

FIG. 6B is a display diagram illustrating the timeline with an additional indication or marker region 604 corresponding to the region or time span at which the annotation was added. A user may be able to indicate a time span, e.g., by dragging a mouse pointer.

Figure 7A:
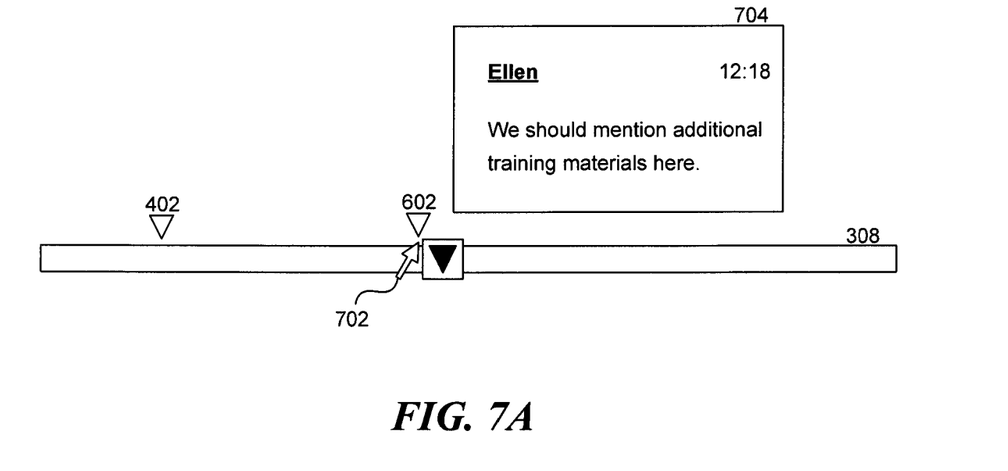

FIG. 7A is a display diagram illustrating rendering of a text annotation. The annotation can be rendered when rendering of the media file reaches a point or region with which an annotation is associated. As an example, when rendering reaches 12 minutes and 18 seconds from the beginning of the media file, the facility renders the annotation added by Ellen in a text annotation region 704. The annotation may appear for a specified period of time, such as a few seconds. There may also be an area in the user interface for showing annotations as they appear in the media file during rendering. In such a case, an annotation would appear at the time it appears during rendering, but not disappear until a new annotation appears. Alternatively, the facility can display the annotation when the user positions a mouse pointer 702 on or near the indication or marker 602.

Figure 7B:
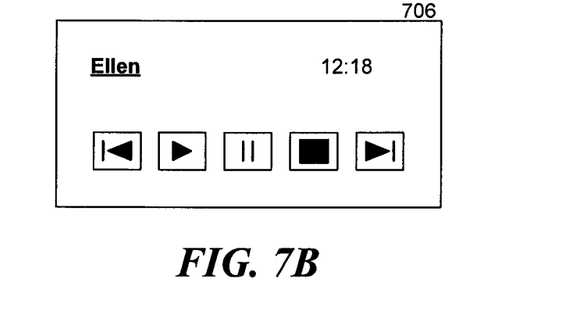

FIG. 7B is a display diagram illustrating a multimedia annotation region 706 that the facility may employ rather than the text annotation region 704 when a multimedia annotation is stored. The multimedia annotation region may have playback controls, as illustrated, to start or control rendering of the annotation.

Figure 8A:
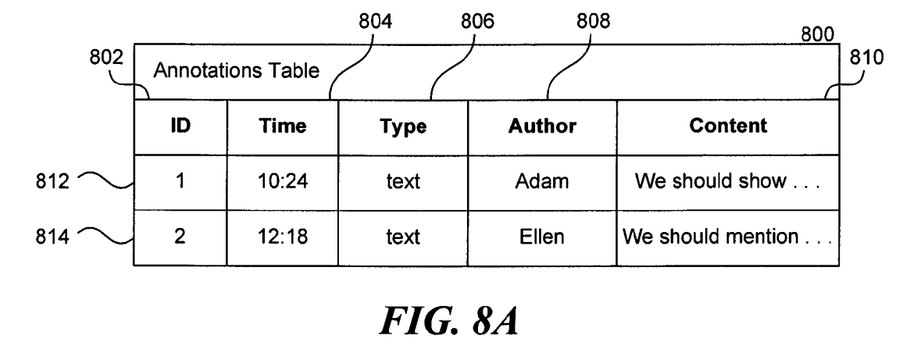
FIGS. 8A-8B are table diagrams illustrating annotations tables in various embodiments.
Figure 8B:
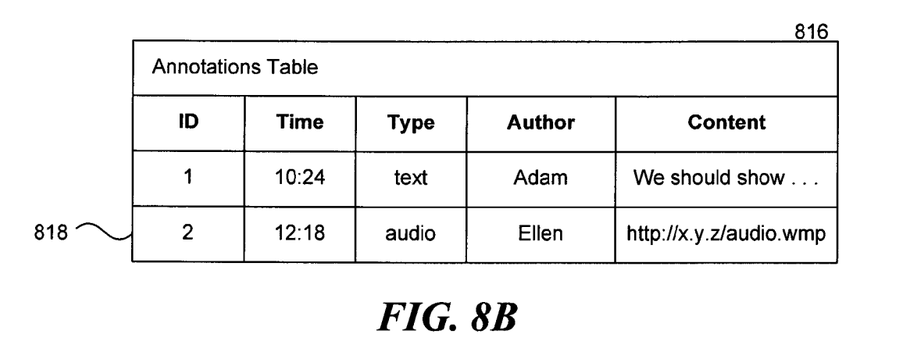

FIGS. 8A-8B are table diagrams illustrating annotations tables in various embodiments. The facility employs annotations tables to store annotation information. Each annotations table is associated with a media file.

Annotations table 800 of FIG. 8A has ID 802, time 804, type 806, author 808, and content 810 columns. The ID column identifies each stored annotation. The time column indicates a time or time span, in relation to the beginning of the media file, with which the annotation is to be associated. As an example, annotation 812 is associated with the media file at 10 minutes and 24 seconds after the beginning of the media file. The type column indicates the type of the annotation. Other types of annotations include audio, video, image, document change, and so forth. Annotations 812 and 814 are text annotations. The author column indicates the user who provided the annotation. The content column stores the contents of the annotation. The content column can contain text, an identifier of a file (e.g., uniform resource locator or file path), identification of a position in a document and a change made by the user, and so forth.

Annotations table 816 of FIG. 8B is similar to the annotations table 800 of FIG. 8A, except that annotation 818 indicates that Ellen provided an audio file that is to be associated with the media file at 12 minutes and 18 seconds after the beginning of the media file.

While FIGS. 8A and 8B and their related description show tables whose contents and organization are designed to make them more comprehensible by a human reader, those skilled in the art will appreciate that actual data structures used by the facility to store this information may differ from the tables shown, in that they, for example, may be organized in a different manner, may contain more or less information than shown, may be compressed and/or encrypted, etc.

Figure 9:
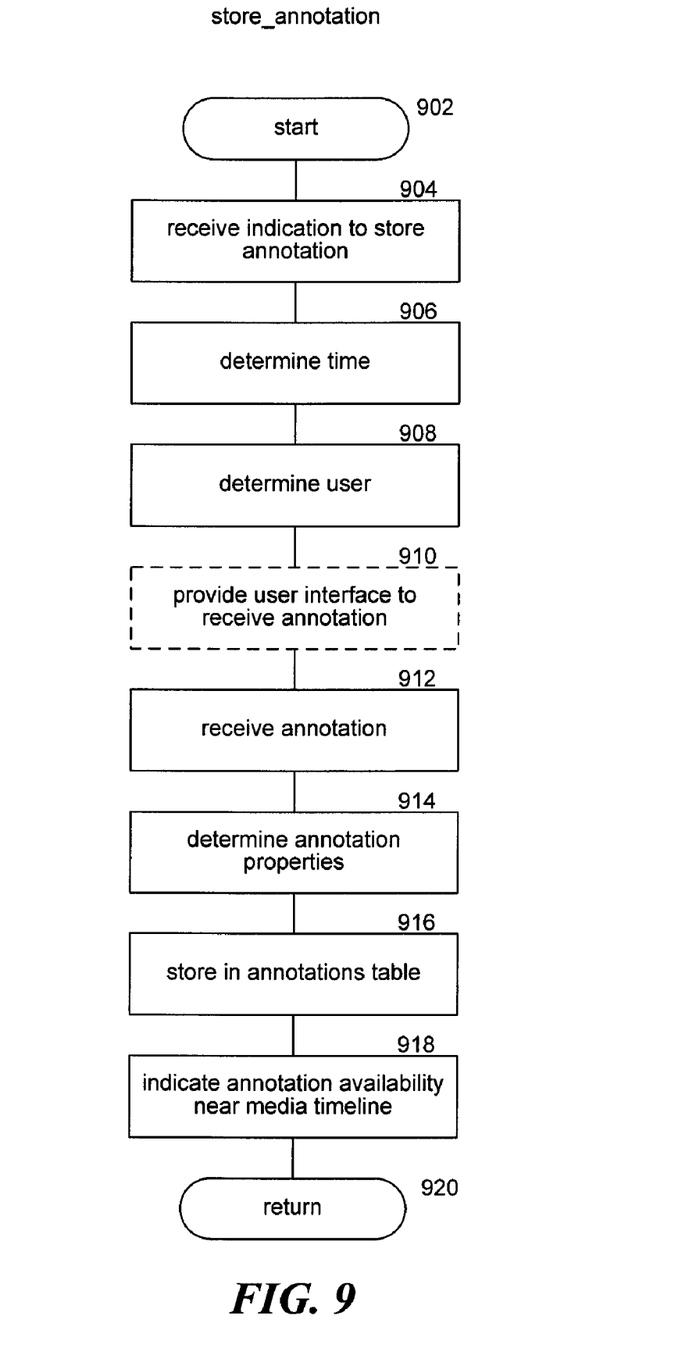
FIG. 9 is a flow diagram illustrating a store_annotation routine invoked by the facility in some embodiments.

FIG. 9 is a flow diagram illustrating a store_annotation routine invoked by the facility in some embodiments. The facility invokes the store_annotation routine to store annotations. As an example, the facility invokes the store_annotation routine to store annotations that it receives from a user. As another example, the facility invokes the store_annotation routine to store annotations that it creates based on actions performed by users. The routine begins at block 902.

At block 904, the routine receives an indication that an annotation is to be stored. As an example, the routine may receive the indication when the user selects a command to enter an annotation. As another example, the routine may receive the indication when a user makes a change to a document that is being shared.

At block 906, the routine determines the time in relation to the beginning of the media file. The time is used to associate the annotation with a particular point or region in the media file. When the annotation is to be associated with a time span, the facility may determine a beginning and end time, such as under user direction.

At block 908, the routine determines which user made the annotation. As an example, the facility may determine which user is presently logged into the system or is responsible for making mouse or keyboard events that are shared with other participants of a collaboration session.

At block 910, the routine provides a user interface that the user can use to provide the annotation. In embodiments in which the facility automatically determines annotations, the facility may not provide such a user interface.

At block 912, the routine receives an annotation or an indication of an annotation, such as the uniform resource locator or file path.

At block 914, the routine determines properties for the annotation that are to be stored in an annotations table. As an example, the routine may determine a type of the annotation.

At block 916, the routine stores annotation information in an annotations table associated with the media file. As an example, the routine stores a time or time span, annotation type, author identifier, and annotation in the annotations table.

At block 918, the routine indicates availability of an annotation, such as by illustrating a marker, near a media timeline associated with the media file. The position of the indication may correspond to the time at which the annotation is associated with the media file in relation to the duration of the media file. As an example, an annotation associated with the media file near the beginning of the media file would appear near the beginning of the timeline. In contrast, an annotation associated with the media file near the end of the media file would appear near the end of the timeline.

At block 920, the routine returns.

Figure 10:
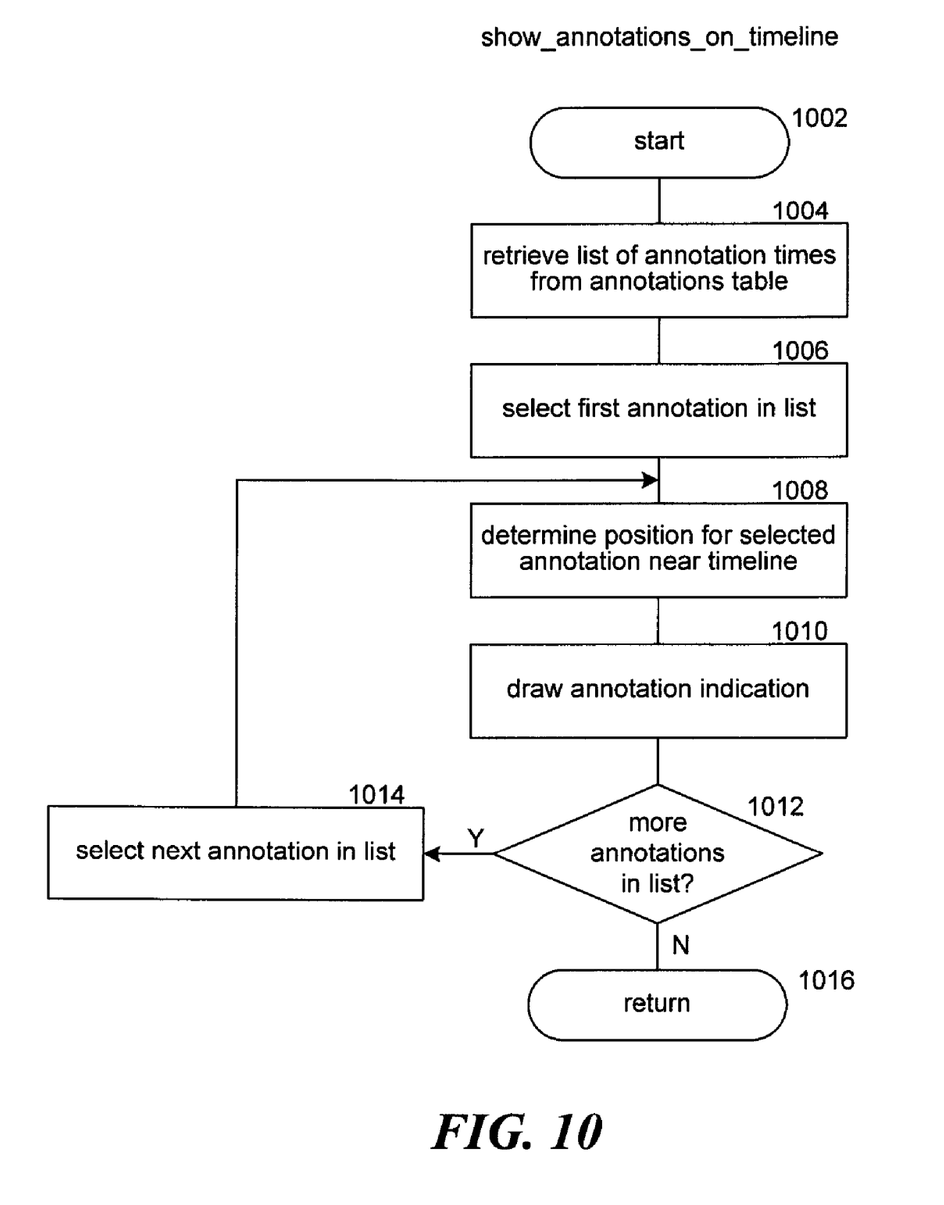
FIG. 10 is a flow diagram illustrating a show_annotations_on_timeline routine invoked by the facility in some embodiments.

FIG. 10 is a flow diagram illustrating a show_annotations_on_timeline routine invoked by the facility in some embodiments. The facility may invoke the show_annotations_on_timeline routine when indications of annotations, such as markers, are to be illustrated near the timeline. As an example, the facility may invoke the routine when the user has provided search criteria for annotations and the facility has identified annotations that match the search criteria. In such a case, markers may be illustrated for each annotation matching the search criteria. The routine begins at block 1002.

At block 1004, the routine retrieves a list of annotation times from an annotations table associated with the media file.

At block 1006, the routine selects the first annotation in the list.

At block 1008, the routine determines a position for the selected annotation near the timeline. The position may correspond to the time at which the annotation is associated with the media file in relation to the duration of the media file. As an example, an annotation associated with the media file near the beginning of the media file would appear near the beginning of the timeline. In contrast, an annotation associated with the media file near the end of the media file would appear near the end of the timeline.

At block 1010, the routine draws an indication of the annotation, such as a marker, near the timeline at the determined position.

At decision block 1012, the routine determines whether there are more annotations in the list that have not yet been processed. If there are more annotations in the list, the routine continues at block 1014. Otherwise, the routine continues at block 1016 where it returns.

At block 1014, the routine selects the next annotation in the list. The routine then continues at block 1008.

Figure 11:
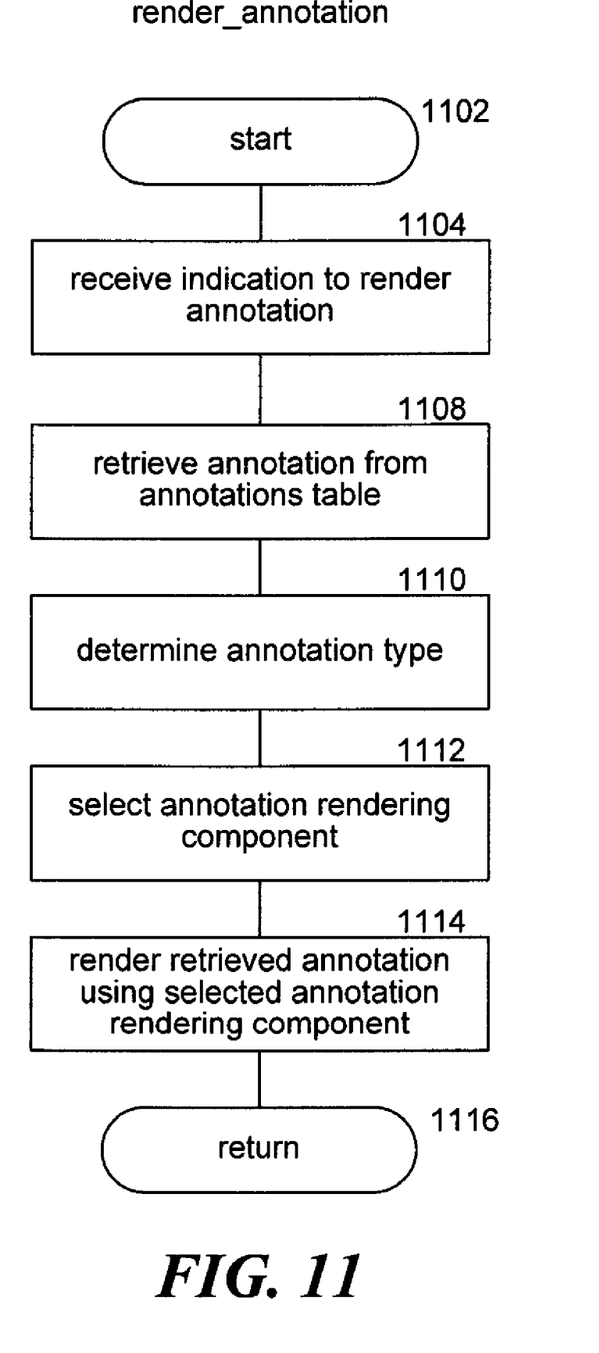
FIG. 11 is a flow diagram illustrating a render_annotation routine invoked by the facility in some embodiments.

FIG. 11 is a flow diagram illustrating a render_annotation routine invoked by the facility in some embodiments. The facility invokes the render_annotation routine to render stored annotations. The routine begins at block 1102.

At block 1104, the routine receives an indication to render an annotation. As an example, the routine receives an indication to render an annotation when the user positions a mouse pointer near an annotation indication. Alternatively, the routine receives an indication to render an annotation when a media file is rendered to a position at which an annotation was associated.

At block 1108, the routine retrieves an annotation from the annotations table corresponding to the time. As an example, the routine retrieves an annotation associated with a marker or indication that the user has selected. Alternatively, the routine retrieves an annotation associated with a time or time span corresponding to the position of the media file that is being rendered.

At block 1110, the routine determines an annotation type for the retrieved annotation.

At block 1112, the routine selects an annotation rendering component for rendering the annotation type. As an example, the routine may select a text annotation rendering component, audio annotation rendering component, video annotation rendering component, and so forth.

At block 1114, the routine renders the retrieved annotation using the selected annotation component.

At block 1116, the routine returns.

Those skilled in the art will appreciate that the steps shown in FIGS. 9-11 and their relating description may be altered in a variety of ways. For example, the order of the logic may be rearranged, logic may be performed in parallel, logic may be omitted or added, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method, performed by a first application executing at a computer system having a digital data storage device, for annotating a multimedia file, comprising:
   displaying a timeline, the timeline indicative of a duration of the multimedia file;
   receiving an indication to add an annotation at an annotation time relative to the duration indicated by the timeline, the indication automatically made by the first application while observing a user action in respect to use by a user of a second application that is different from the first application and executing at the same computer system as the first application, wherein the annotation includes information relating to a change the user made to a document opened by the second application;
   identifying the annotation based on the user action;
   storing in the digital data storage device the received annotation;
   associating the stored annotation with the annotation time; and
   displaying at an area near the timeline an indication of the stored annotation, the area corresponding to the annotation time.

2. The method of claim 1 wherein the multimedia file is a digitized recording of a collaboration.

3. The method of claim 1 wherein an information associated with the annotation includes an identification of a user adding the annotation.

4. The method of claim 1 wherein an information associated with the annotation includes an indication of a time relative to the beginning of the media file.

5. The method of claim 1 wherein the annotation is text.

6. The method of claim 1 wherein the annotation is an audio file.

7. The method of claim 1 wherein the annotation is a video file.

8. The method of claim 1 wherein the annotation is a multimedia file.

9. The method of claim 1 wherein the second application is a presentation program.

10. The method of claim 1 wherein the user action is to modify a document opened by the second application.

11. A system for annotating a media file, comprising:
a computing device having a processor and one or more computer-readable storage media, the computer-readable storage media collectively storing:
- a component associated with a first application that receives an annotation, the annotation added at an annotation time relative to an end of the media file, the annotation time identified by a position on a timeline representing a duration of the media file;
- a component associated with the first application that stores the annotation and annotation time in association with the media file;
- a component associated with the first application that displays at an area near the timeline an indication of the annotation time; and
- an annotation creation component that automatically creates an annotation based on observation of a user action in respect to use by a user of a second application that is different from the first application, wherein the annotation includes information relating to a change the user made to a document opened by the second application.

12. The system of claim 11 wherein the user action is to modify a shared document.

13. The system of claim 11 further comprising an annotation search component that searches for stored annotations matching a search criterion.

14. The system of claim 13 wherein the component that displays indications of stored annotations displays stored annotations matching the search criterion.

15. The system of claim 11 wherein the second application is a spreadsheet program.

16. The system of claim 15 wherein the user action is to modify contents of a spreadsheet cell.

17. A computer-readable storage medium storing computer-executable instructions that, when executed, cause a computer system to perform a method for creating annotations corresponding to a multimedia file, the method comprising:
- observing by a first application a user action in respect to use by a user of a second application that is different from the first application, wherein the first and second applications execute at the same computer system;
- automatically creating an annotation corresponding to the multimedia file based on the user action, wherein the annotation includes information relating to a change the user made to a document opened by the second application; and
- storing the change in a manner that enables a search for the change so that playback of the multimedia file can begin at a point corresponding to when the change was made relative to a beginning of the multimedia file.

18. The computer-readable medium of claim 17 wherein the second application is a presentation program.

19. The computer-readable medium of claim 18 wherein the user action is to modify a document opened by the second application.

20. The computer-readable medium of claim 17 wherein the second application is a spreadsheet program.

21. The computer-readable medium of claim 20 wherein the user action is to modify contents of a spreadsheet cell.

* * * * *